Patented Nov. 1, 1927.

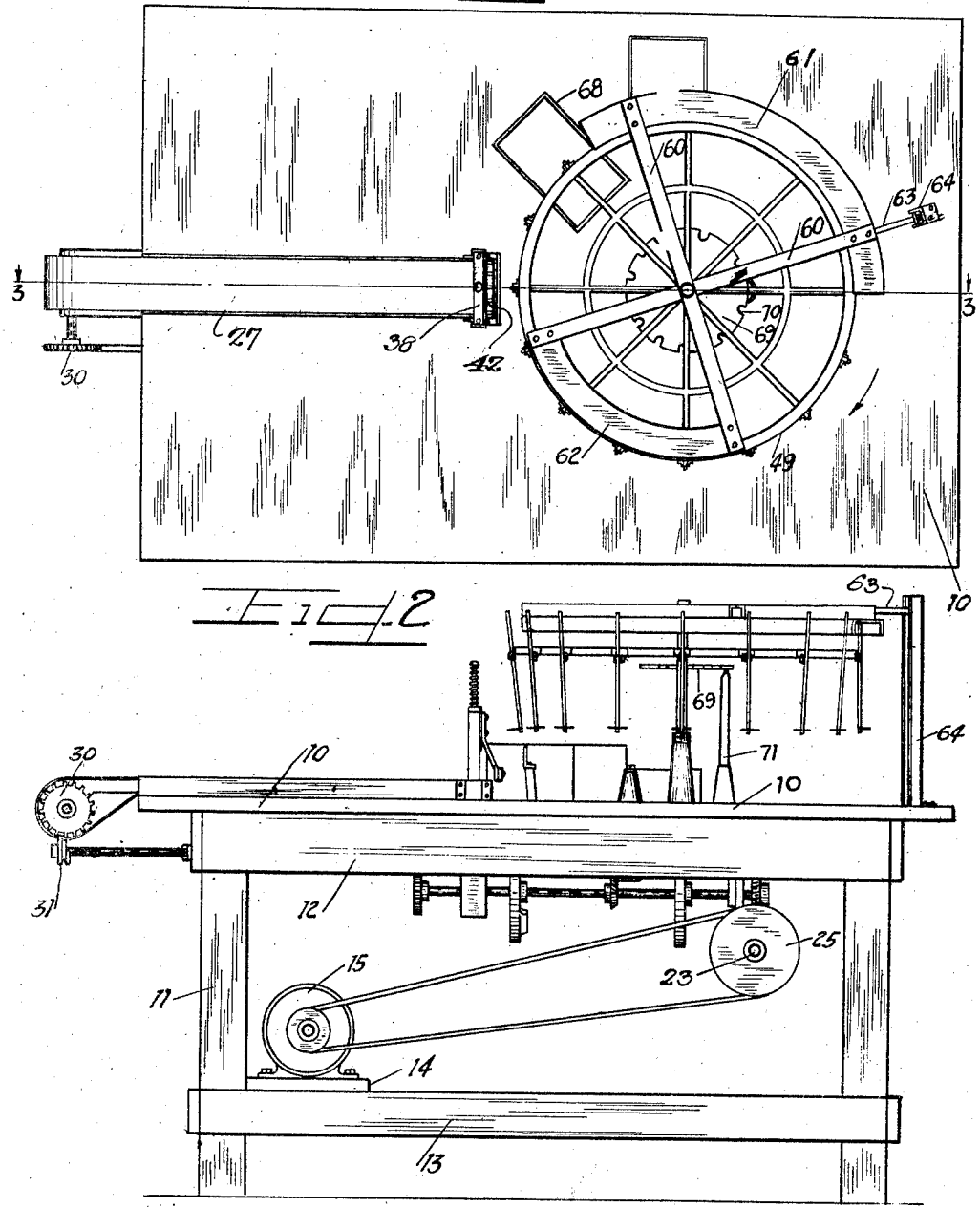

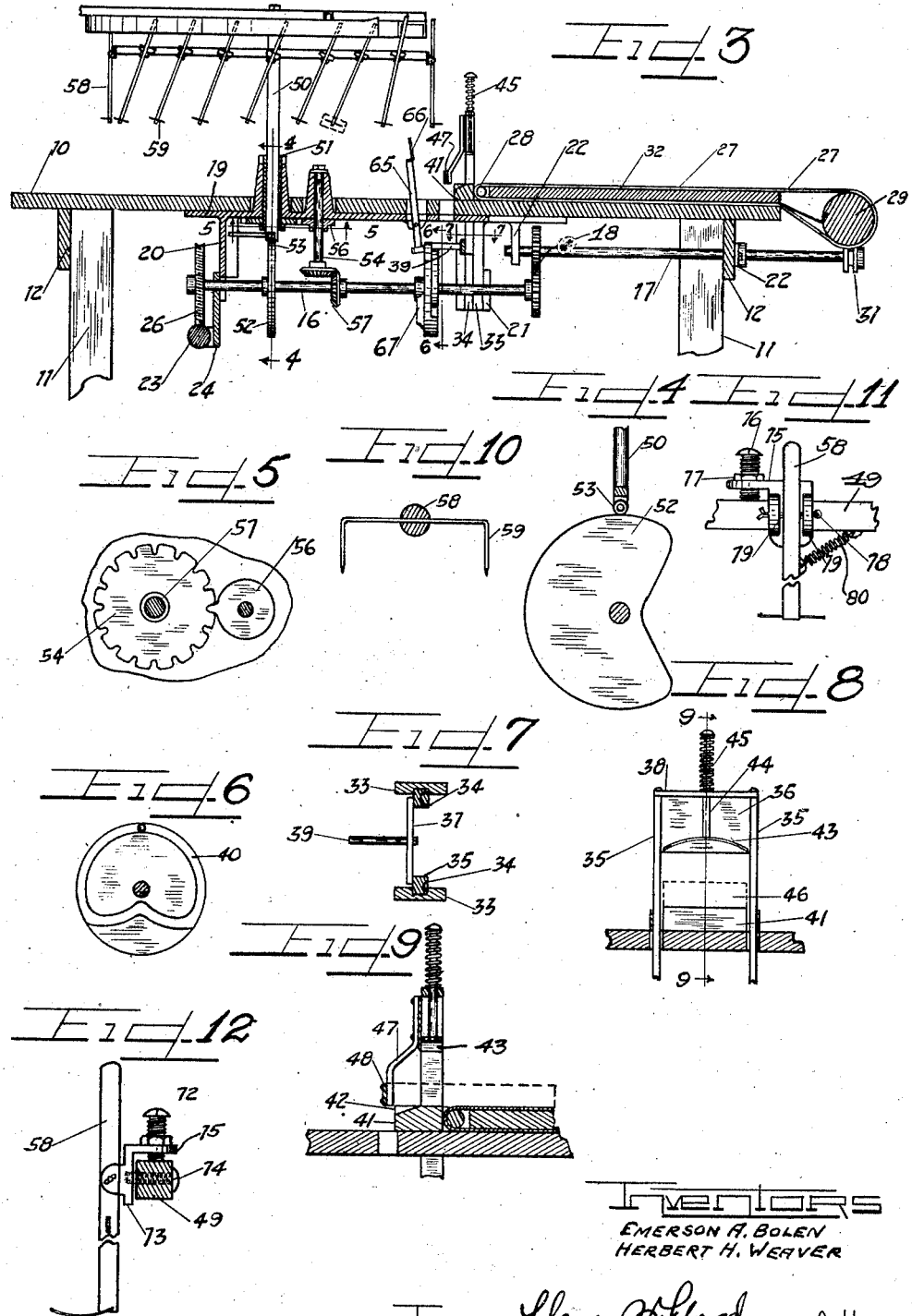

1,647,594

UNITED STATES PATENT OFFICE.

HERBERT H. WEAVER, OF CHICAGO, AND EMERSON A. BOLEN, OF MORRIS, ILLINOIS, ASSIGNORS TO NORTHWESTERN CORPORATION, OF MORRIS, ILLINOIS, A CORPORATION OF ILLINOIS.

CUTTING AND COATING MACHINE.

Application filed April 7, 1923. Serial No. 630,456.

The present invention has to do with a machine for the production of chocolate coated ice cream bars, ordinarily designated in the trade as "Eskimo pies."

It has for its principal object the correlation of the several steps required in the production of such confections from brick ice cream, in a single machine. Included in the objects of the invention are the improvement of ice cream cutting devices, and of dipping mechanisms, and the provision of means for securing regulated intermittent reciprocal and rotative movements incidental to successfully coating such confections.

The objects hereinbefore recited, and such other objects as may hereinafter appear, are attained by the novel construction, combination, and arrangement of the parts of our device, which is fully illustrated in the accompanying two sheets of drawing made a part of this specification.

In the drawings:

Fig. 1 is a top plan view of a complete cutting and dipping machine;

Fig. 2 is an elevation thereof;

Fig. 3 is a vertical section through the center of the machine along the line 3—3 of Fig. 1 looking in the direction of the arrows;

Fig. 4 is a sectional detail along the line 4—4 of Fig. 3 showing the rack lifting cam;

Fig. 5 is a horizontal detail along the line 5—5 of Fig. 3 showing the means employed for obtaining intermittent rotative movement of said rack;

Fig. 6 is an elevation of the cam controlling the knife actuation, and is taken along the line 6—6 of Fig. 3;

Fig. 7 is a horizontal section along the line 7—7 of Fig. 3;

Fig. 8 is an elevation of the cutting device;

Fig. 9 is a vertical section on the line 9—9 of Fig. 8;

Fig. 10 is a transverse section through one of the dipping hooks; and

Figs. 11 and 12 are front and side fragmentary elevations of the connecting member intermediate the hook members and rack.

Like reference characters are used to designate similar parts in the drawings and in the description which follows.

For convenience in description, each function of the machine will be taken separately. The device, although comprising several separated parts, works as a unit for production, and is contained upon a single frame or platform.

The ordinal 10 is used to designate the flat top of a table having legs 11, aprons 12, and cross-pieces or braces 13. Upon a suitable member 14 secured intermediate two of cross-pieces 13, a prime mover, preferably an electric motor 15, is installed. Suspended to the under side of the table and longitudinally disposed with respect thereto is a main shaft 16 and an auxiliary shaft 17 parallel to said main shaft. Intermediate said shafts are bevel gears 18.

The several functions of the machine are controlled and timed by the main shaft 16 and auxiliary shaft 17 which are journaled to a bed 19 secured to the under side of table top 10. Brackets 20 and 21 for supporting the main shaft 16, and a bracket 22 for the auxiliary shaft, depend from bed 19 while the outer bearing 22 for the auxiliary shaft 17 is secured in one of aprons 12.

For driving the main shaft 16 a worm 23 is journaled in a bracket 24 depending from bracket 20. A pulley 25 secured to said worm 23 is rotated by a belt driven by motor 15. Worm 23 meshes with a worm-wheel 26 fixedly secured adjacent one end of said main shaft 16. Rotation of shaft 16 drives auxiliary shaft 17 through gears 18, the rotation of the two shafts being in opposite directions.

In the production of Eskimo pies it is customary and usual to employ what is known as a half-depth brick mold. The ice cream is frozen in a shallow mold, of predetermined width and of half the usual depth of a brick mold, and the cores for the Eskimo pies are cut from ice cream so molded.

Such slabs or blocks of ice cream are placed upon an endless belt 27 rotating about a small roller 28 journaled adjacent to the ice cream cutting apparatus to be later described, and a larger and driven pulley 29 carried in a housing secured to table top 10. The latter pulley is provided with a toothed wheel 30 meshing with a short worm 31 secured to auxiliary shaft 17 to enable the production of intermittent rotative movement of said pulley 29, whereby to advance the belt 27 predetermined short distances. Intermediate the layers of the belt 27 is a slab-like support 32 upon which the upper layer of the belt travels, any tendency of belt 27 to sag under the weight of the ice cream being thus prevented. With each advance of belt 27, the slab or block of ice cream carried thereby is advanced toward and beneath the cutting mechanism now to be described.

Bed 19 is provided with two oppositely disposed depending vertical guide members 33. Each guide member 33 has a central groove or track 34, best shown in Figs. 3 and 7. Operating reciprocally in tracks 34 are knife supports 35 intermediate which a knife 36 is disposed. Adjacent their lower ends, knife supports 35 are spaced apart by a cross-piece 37 secured thereto, and at their upper extremities a second cross-piece 38 is employed. Vertical reciprocal motion of the knife frame 35 is obtained by the engagement of a horizontally disposed rod 39 secured to lower cross-piece 37, and coacting with the track of heart-shaped cam 40 secured to and rotating with main shaft 16. A cutting block 41, best shown in Figs. 3, 8 and 9 is disposed immediately adjacent pulley 28. This block 41 is toothed as indicated in Fig. 9, in order to present to the under surface of each core of ice cream as it is cut off, a series of narrow supporting edges 42 rather than a solid surface. Such supports or teeth 42 prevent sticking of ice cream to block 41, and avoid the accumulation of a large volume of waste beneath the cutting device.

A clamping member or grip piece 43 is provided for operation with and in connection with the knife 36. Such grip piece 43 has a bowed gripping face secured to a rod 44 passing through upper cross bar 38. The rod 44 is provided with a spring 45 coiled thereabout in order to admit of variances of movement between the knife 36 and grip piece 43. For example, grip piece 43 remains stationary after engaging upon a block of ice cream (designated 46) while the knife 36 passes therethrough. In this manner the block of ice cream 46 is secured against backward displacement upon the then stationary belt 27, insuring that when belt 27 again moves such ice cream block will be occupying the same position it occupied when blade 36 was moving downwardly therethrough during its cutting operation.

A guide to determine the thickness of the slice of ice cream cut from block 46 is provided, such guide being attached to the knife supports 35 and comprising a plurality of brackets 47 extending forwardly of the knife blade 36. A cross piece 48 is provided between said brackets, such cross piece 48 serving to arrest the advance of the block of ice cream 46 through the knife supports 35 when belt 27 is advancing. By adjusting the brackets 47 or by changing the adjustment of cross piece 48 with respect to brackets 47, the portion of ice cream projected through the knife supports 35 at each intermittent advance of belt 27 is measured. Even though the advance of belt 27 is in excess of that necessary to advance the block of ice cream 46 against the cross piece 48, the movement of block of ice cream 46 will be arrested and the belt 27 will slip thereunder. By the adjustment of either brackets 47 or the cross-piece 48, the size of the Eskimo pie may be determined in advance without any additional adjustment of the mechanism of the machine.

It will be well to state in specific detail how the slabs or bricks of ice cream are converted into blocks or bars for coating. Already it has been indicated that blocks of ice cream are placed upon belt 27, and advance therewith predetermined distances intermittently. Such intermittent advances are controlled and timed by the gearing 30 and 31.

Each of such advances occurs while the knife 36 is in its uppermost position. The block of ice cream 46 is propelled under the knife 36 and between knife supports 35 by such intermittent movements until its forward movements are with each advance arrested by cross-piece 48. As each intermittent movement of belt 27 ceases, the rotation of main shaft 16 to which cam 40 is secured causes the knife supports 35 to be drawn downwardly with the displacement of rod member 39 incident to its engagement with the track in the face of said cam. The knife 36 is thus forced through block of ice cream 46, slicing off a predetermined portion thereof, the stop member 48 at the same time travelling downwardly through an orifice in the table top 10 provided therefor. With the descent of knife 36, grip member 43 presses upon the remaining portion of block of ice cream 46 and exerts a spring controlled pressure thereon to insure that the remaining portion of block 46 will not be forced away from the route of travel of knife 36, thus providing vertical edges for the cutoff portions as well as uniformly sized slices.

The cutoff portion or slice of ice cream produced is now ready to be picked up by the dipping mechanism later to be described.

As the knife 36 moves upwardly to allow the block 46 to again be advanced thereunder, stop member 48 alines itself with the end of block 46 and grip-piece 43 releases its pressure therefrom. Immediately belt 27 advances carrying the block of ice cream 46 through knife supports 35 preparatory to cutting therefrom the next slice or core of ice cream.

For dipping slices of ice cream thus produced, a horizontally disposed circular rack is provided. This is best shown in Figs. 1, 2 and 3. The rack comprises a spoked and braced wheel 49 fixed to a shaft 50 journaled for rotative and reciprocal movement upon a hub projecting from bed 19, said hub preventing lateral tipping or movement of said axle. A collar 51 is secured about shaft 50 and within said hub so that rotative movement transmitted to said collar will cause shaft 50 to rotate, thus revolving wheel 49, but reciprocal movement of shaft 50 through said collar 51 is readily had without longitudinal displacement of said collar.

To obtain the reciprocal vertical movement of shaft 50 referred to, a cam 52 or irregular contour, best shown in Fig. 4, is secured to shaft 16. A roller bearing 53 may be secured to the lower end of shaft 50 and may be provided with a pivoted bearing and guide means which is to be held in alinement with the periphery of cam 52.

The gearing required to advance said rack a fractional turn (one sixteenth) each time it is in elevated position comprises a toothed wheel 54, having as many teeth (sixteen) as there are dipping hooks upon said rack 49. Journaled in vertical relation to bed 19 is a second shaft 55 having a single toothed pinion 56 affixed thereto, such pinion 56 advancing toothed wheel 54 one notch with each of its complete revolutions. Bevel gearing 57 is provided between main shaft 16 and vertical pinion shaft 55.

A plurality of dipping members (sixteen), the number corresponding to the number of notches in toothed wheel 54, are loosely mounted upon the periphery of rack 49. Each dipping member comprises a vertical element, rodlike in character, designated 58, having adjacent its lower extremity two prongs 59 projecting outwardly therefrom in parallel relation. The upper extension of the rod 58 above its pivotal connections engages with guide members during the rotative movement of rack 49, such guide members being loosely secured at the top of vertical shaft 50 and including radial frame members 60 and two metallic tracks 61 and 62, the first being adapted to tilt the hooks at an angle, facilitating the dripping of coating from the coated bars of ice cream, while the second engages the topmost portion of rod 58 inwardly in order to limit movement of the rod 58 as an incident to the removal of the coated bar from hook or tongs 59. Each of the tracks 61 and 62 comprises substantially a quarter or more of the circumference of rack 49. Rotative displacement of the frame 60 and of the tracks 61 and 62 is avoided by providing a projecting arm 63 affixed to said frame. Such arm projects outwardly beyond the rack 49 into a U-shaped vertical track 64 secured to table top 10. As frame 60 and tracks 61 and 62 rise and fall with rack 49, arm 63 slides up and down in track 64.

To imbed the hooks 59 within the cutoff blocks or slices of ice cream, a kicker bar 65 pivotally connected to bed 19 is employed. The upper section thereof comprises a plate 66 of such width that it will impinge the back of hooks 59, while the lower section comprises a freely rotating roller bearing in engagement with the back surface of cam 40, which back surface is also cammed at 67. When rack 49 is in its lowermost position, cam 67 causes a sharp movement of the upper portion of kicker bar 65 against hooks 59 whereby said hooks will be imbedded in the slice of ice cream resting upon cutter block 41.

In addition to the movement of kicker bar 65 being timed by cam 67 to be coincident with the lowermost position of rack 49, said rack is adjusted by reference to collar 51 whereby to present at the close of each intermittent rotative movement a new hook for picking up slices of ice cream. After a slice of ice cream has been imbedded upon hooks 59 and upon the second vertical downward movement of rack 49 thereafter, such ice cream is immersed in a tank 68 which is filled with a coating material, and which may be heated and thermostatically equipped, if it is necessary to keep the coating material contents thereof in liquid condition. Immediately upon the next succeeding lifting movement of rack 49, rod 59 engages upon track 61 and the coated bar is then held at an angle whereby the uncongealed coating material is caused to run to one corner thereof and drip off. The bar is kept in this tilted position for more than one quarter of a turn of rack 49, after which the rod 58 is released to take its normal position. Said rod 58 next engages track 62 which holds the rod 58 vertically and prevents inward movement of hooks 59 whereby to facilitate the manual removal of the coated ice cream bar, upon which the coating material has by such time thoroughly congealed.

Although it is believed that the operation of rack 49 is perfectly clear, it may be said by way of further explanation that the rack 49, when in its lowermost position, presents one of hooks 59 adjacent to block 41 upon which is deposited an uncoated slice of ice cream. Kicker bar 65 is actuated by cam 67 driven by main shaft 16 to force the hooks 59 into such ice cream block, imbedding the same securely thereon. The rack 49 immediately lifts and is advanced one-sixteenth turn. It drops to its lowermost position when a second slice of ice cream is picked up in the same manner. The rack is again raised, turns one-sixteenth of a rotation, and coincident with the picking up of the third slice of ice cream, the slice first referred to is immersed in coating material contained in tank 68. The rack is again raised and rotated one-sixteenth turn. The rod carrying the first coated bar engages track 61 whereby the bar is tilted to facilitate draining.

The reciprocal movement of rack 49 is so timed that the immersion of the slice of ice cream in tank 68 occupies but a fraction of a second thus avoiding any tendency of the ice cream to liquify in the coating material.

That there may be obtained in the position occupied by the hook members when in downmost extension, exact registration with the slices of ice cream as cut, adjustability is provided as is disclosed in Figs. 11 and 12 and by the guide mechanism for rack 49 illustrated in Figs. 1 and 2.

The guide mechanism for rack 49 includes a circular disk 69 affixed to shaft 50. A plurality of U-shaped notches or indentations 70 are provided upon the periphery of disk 69. As many notches or indentations 70 as there are hook members 58 are provided and as rack 49 is lowered, the interior wall of said notches engages with a pin 71 secured to table top 10. The diameter of pin 71 is such, except at its conical point, that it occupies substantially the entire width of a notch or indentation 70, thus securing rack 49 against rotary displacement while the latter is in downmost position. It is hardly necessary to add that notches in disk 69 are so disposed with relation to pin 71 that hooks 59 carried by rack 49 register with ice cream block 46 as the rack 49 is lowered to its downmost extension.

Reference should now be had to Figs. 11 and 12. Rods 58 are attached to rack 49 by a connecting member or carrier 72, the body 73 of which is secured to rack 49 by a pin 74 admitting of swinging movement tangential to the periphery of rack 49. A lug 75 projecting from the side or end of body 73 is threaded to receive an adjusting screw 76 upon which a lock nut 77 is disposed. By rotation of screw 76, the end of which engages upon rack 49, rod 58 may be tilted either to the right or left in order that its hook end may be made to register accurately with block 46 when rack 49 is in downmost position. Lock nut 77 is employed to secure the adjustment of adjusting screw 76 determined upon.

To admit of a swinging radial movement of rod 58, said rod is pivotally mounted upon carrier 72 through the agency of a pin 78 (a cotter pin disclosed in the drawing), passing through ears 79 projecting outwardly and parallel from body 73, such pin 78 passing transversely through the body of rod 58.

Carrier 72 is yieldingly held in adjusted position by a coil spring 80 secured at one end to rack 49 and at the other end to rod 58, as is clearly illustrated in Fig. 11.

We claim:

1. In a coating machine, means for feeding confection centers, a rotatable rack having a plurality of confection holding hooks, means for lowering and raising said rack, an actuating member for imbedding said hooks in the confection centers, and a coating material tank adapted to receive said centers one at a time as said rack is lowered.

2. A machine for coating ice cream comprising means for slicing bars of ice cream from bricks thereof, a rotatable rack having a plurality of spaced hook members, means for raising and lowering said rack, a kicker bar impinging said hook members for impaling said bars of ice cream thereupon, a tank for coating material adapted to receive such impanelled bars of ice cream one at a time, and means for intermittently rotating said rack a fraction of a revolution.

3. A machine for coating ice cream comprising a rack provided with a plurality of hook members, means for imparting alternately rotative and reciprocal movements to said rack, mechanism for producing bars of ice cream conjointly with the reciprocal movement of said rack, a kicker bar impinging said hook members in rotation and when in lowermost position, a tank adapted to immerse in rotation the material suspended upon said hooks, and guide members for said hooks adapted to tilt the coated material suspended thereon to facilitate drainage of uncongealed coating material and for removal.

4. A confection coating machine comprising a rotating rack, hooked members suspended therefrom, guide means adapted to tilt said hooks to different angles during the rotation of said rack, said guide means including a frame pivoted upon said rack and means for preventing rotative movement of said frame, and a tank for coating material in juxtaposition to said rack.

5. In an ice cream coating machine, a tank for coating material, a rack provided with hook members, and a pusher bar impinging said hook members, said rack and pusher bar being actuated by a single driving member, and said hooks being adapted to be immersed in said tank one at a time.

6. An ice cream coating and dipping machine comprising a frame, a prime mover, a driven shaft upon said frame, a rack slidably and rotatably mounted upon said frame, means for intermittently raising and lowering said rack, a gear and pinion intermediate said rack and said shaft for imparting to said rack a fractionl revolution when in raised position, a conveyor for ice cream, a reciprocating knife adapted to slice ice cream upon said conveyor, hook members upon said rack to impinge the slices of ice cream, a kicker bar for advancing said hook members toward and into such slices of ice cream, a tank for coating material to receive slices of ice cream upon said hooks, a guide member for tilting said hooks, and a second guide member for swinging said hooks outwardly from said rack.

7. An ice cream cutting and dipping machine as described in claim 6, and in which means are provided upon said shaft for rotating said rack.

8. An ice cream cutting and dipping machine as described in claim 6, and in which means are provided whereby said knife and said rack are raised and lowered conjointly.

9. An ice cream cutting and dipping machine as described in claim 6, and in which means are provided to reciprocate said guide members with said rack.

10. An ice cream cutting and dipping machine as described in claim 6, and in which said guide members are provided with a frame support having an auxiliary guide member whereby to prevent rotation with said rack.

11. An ice cream cutting and dipping machine as described in claim 6, having a single cam member for actuating said kicker bar and said knife.

12. An ice cream cutting and dipping machine as described in claim 6, having means whereby said rack is rotated and said ice cream conveyer is advanced concurrently.

13. An ice cream cutting and dipping machine as described in claim 6, having means whereby to twice reciprocate each bar of ice cream upwardly and downwardly before immersion in said tank.

14. An ice cream cutting and dipping machine as described in claim 6, and in which cooperating guide members are provided for equalizing each fractional rotational movement of said rack.

15. An ice cream cutting and dipping machine as described in claim 6, and in which said rack is provided with a perforated plate, and said frame includes a stationary member for engaging said perforated plate during the reciprocal movement of said rack.

16. In a dipping machine, a tank, a rack, a tank for coating material, and dipping hooks swingably secured to said rack and adapted to be immersed in said rack one at a time, and means for tilting said hooks at right angles to the direction of their swinging movement.

17. A dipping machine comprising a tank for coating material, a moving rack, a hook member, and an intermediate member for mounting said hook member and having means for modifying the angular position of said hook member with respect to said rack.

18. A dipping machine comprising a tank for coating material, a rack, a holding member comprising a rod and prongs and adapted to be immersed in said tank, a carrier for said holding member upon said rack and having means for securing said holding member in swingable position, said carrier member having an extension portion, and an adjusting means in said extension portion and engaging said rack whereby to modify the angular relation of said holding member and said rack.

HERBERT H. WEAVER.
EMERSON A. BOLEN.